Oct. 20, 1925.
G. ECKMAN ET AL
1,557,570
MEANS FOR CHARGING THE STORAGE BATTERIES OF WHEELED VEHICLES
Filed Aug. 2, 1923   2 Sheets-Sheet 1
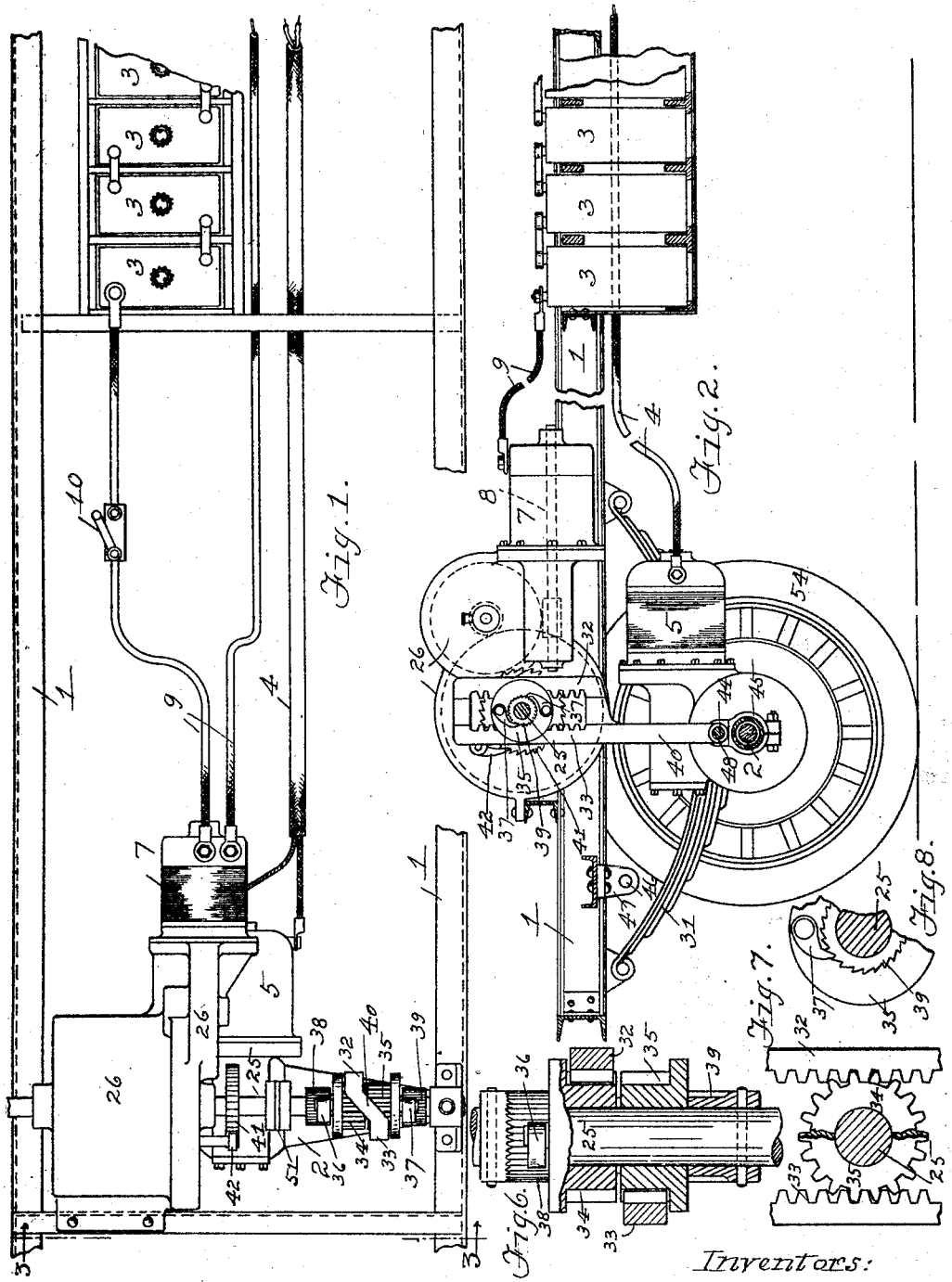
Witness:
Geo. L. Chapel
Inventors:
George Eckman
Albert W. Moore
by Cyrus W. Rice
Attorney.

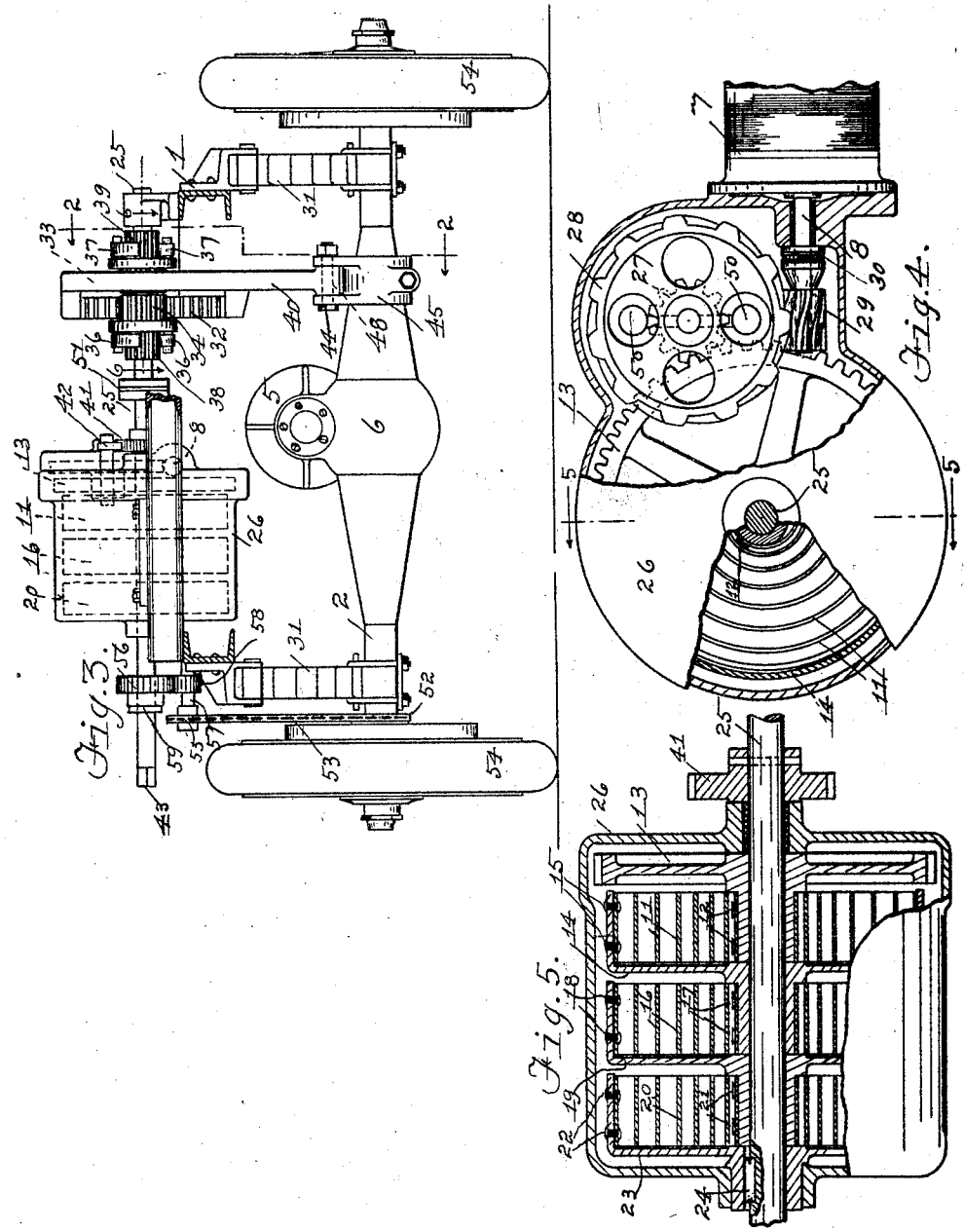

Patented Oct. 20, 1925. 1,557,570

UNITED STATES PATENT OFFICE.

GEORGE ECKMAN AND ALBERT W. MOORE, OF KALAMAZOO, MICHIGAN.

MEANS FOR CHARGING THE STORAGE BATTERIES OF WHEELED VEHICLES.

Application filed August 2, 1923. Serial No. 655,195.

*To all whom it may concern:*

Be it known that we, GEORGE ECKMAN and ALBERT W. MOORE, citizens of the United States, residing at Kalamazoo, in the county of Kalamazoo and State of Michigan, have invented new and useful Improvements in Means for Charging the Storage Batteries of Wheeled Vehicles, of which the following is a specification.

The present invention relates to means for charging the storage batteries of wheeled vehicles; and its object is, generally, to provide spring-actuated means for operating the electric generators whereby such batteries are charged; and more particularly, to provide means whereby the operating spring of such means may be tensioned or wound by the interrelative vertical movements of such members of the vehicles as the axle and main frame thereof, said movements being caused by inequalities of the road over which the vehicle travels.

These and any other objects hereinafter appearing are attained by, and the invention finds preferable embodiment in, the structure hereinafter particularly described in the body of this specification and illustrated by the accompanying drawings, in which:—

Figure 1 is a top plan view of a portion of the chassis of an automobile carrying an embodiment of our invention;

Figure 2 is a side view thereof, certain parts being sectioned on line 2—2 of Figure 3;

Figure 3 is a rear view of the same, certain parts being sectioned on line 3—3 of Figure 1;

Figure 4 is a side view of spring-actuated means for operating an electric generator, parts of the casing and other parts being broken away to show the interior;

Figure 5 is a sectional view of the same taken on line 5—5 of Figure 4;

Figure 6 is a top plan view of a ratchet wheel and pawl and a sectional view of adjacent parts taken on line 6—6 of Figure 3;

Figure 7 is a side view of parts of a pair of gears and toothed racks meshing therewith; and Figure 8 is a fragmentary view of a ratchet wheel and pawl.

In the embodiment of the invention chosen for illustration by the drawings and for detailed description in the body of this specification, our invention is shown applied to an automobile having interrelatively vertically-movable members—the chassis frame 1 and rear axle 2—and carrying an electric storage battery 3 connected by the electric connections 4 with the electric motor indicated at 5 whereby the automobile is propelled through the differential gearing in the housing 6, all these parts being of any usual and well-known type and construction. An electric generator or dynamo 7 driven by the rotatable shaft 8 generates electricity for charging the battery, transmitting the same to the battery through the electric connections 9, preferably provided with a circuit closer and opener 10 which may be located in any convenient position. This generator is operated by revolving its shaft 8 by means of mechanism comprising a coiled spring, or series thereof as shown, the inner end of one, 11, of these springs being secured at 12 to the hub of the gear 13, the drum 14 being secured at 15 to the outer end of said spring, and the inner end of the adjacent spring 16 being secured at 17 to the hub of said drum 14. The outer end of the spring 16 is in like manner secured at 18 to the drum 19 to whose hub the inner end of the third spring 20 is secured at 21, the outer end of the spring 20 being secured at 22 to the drum 23 whose hub is keyed at 24 to the shaft 25. It will be seen that the gear 13 and the hubs of the first and second drums 14 and 19 being rotatable on the shaft 25, the rotation of this shaft in one direction (the gear 13 being held against like rotation) will tension or wind the said springs. The unwinding of this series of springs rotates the gear 13 which drives through a suitable multiplying train of gears—comprising the gear 27, skewed gear 28 and its meshing worm 29—the shaft 8 of the generator. This worm shaft 8 is provided with a thrust bearing furnished with an anti-friction ball race 30 as shown. The said series of springs and gearing are preferably housed in a casing 26. The springs 11, 16 and 20 may be tensioned or wound by various means, some of which are illustrated by the drawings. A preferable means for this purpose is operated by the interrelative vertical movements of the said two members of the vehicle—its frame 1 and rear axle 2— such movements being caused by the jars and jolts resulting from the vehicle's travel over a road having depressions and upward projections whereby the vehicle springs 31 supporting the frame on the axle compress or expand. Said preferable means comprises a vertically extending bar 40 having toothed racks 32, 33 on opposite sides of the shaft 25 and meshing with spring-winding gears 34, 35 respectively, turning freely on said shaft. These gears respectively have pawls 36, 37 which engage the teeth of the ratchet wheels 38, 39 respectively, keyed on the shaft 25, whereby this shaft is rotated in one direction to wind the series of springs, by both the upward and downward movements of the vehicle's frame 1.

A ratchet wheel 41 on the shaft 25 and its detent 42 holds said springs in wound position irrespective of the operation of said pawls. The end 43 of the shaft 25 is shown squared to receive a crank (not shown) whereby the said springs may be wound independently of the toothed racks. When the racks are not in operation the screw bolt 44 whereby the lower end of the bar 40 is mounted on the part 45 carried by the axle 2 may be removed, and said end of the bar may be swung rearwardly-upwardly about the shaft 25, whereupon said bolt may be passed through the hole 46 in the bracket 47 carried by the frame and through the hole 48 in said bar to hold the bar in inoperative position.

A speed governor of any usual form to limit the speed of the generator-operating mechanism is indicated at 50.

A friction clutch, automatically releasable when the driving springs 11, 16 and 20 are wound sufficiently tight, is indicated at 51. The shaft 25 may be turned to wind these springs by other means than those hereinbefore described or illustrated by the drawings; as by the sprocket wheels 52 on one of the rear vehicle wheels 54 and 55 on a stub shaft 57 respectively, carrying the sprocket chain 53. The wheel 55 has a gear 58 meshing with a gear 56 on the shaft 25. A clutch for coupling the gear 56 with the shaft 25 is indicated at 59.

The invention being intended to be pointed out in the claims, is not to be limited to or by details of construction of the particular embodiment thereof illustrated by the drawings or hereinbefore shown or described.

We claim:

1. In a wheeled vehicle having an electric storage battery and spring-connected members interrelatively movable vertically, mechanism of the character described, comprising: an electric generator for charging the battery; spring-actuated means for operating the generator; and connections extending between said members and operated by their interrelative movement for tensioning the spring of said spring-actuated means.

2. In a wheeled vehicle having an electric storage battery and spring-connected members interrelatively movable vertically, mechanism of the character described, comprising: an electric generator for charging the battery; a coiled spring mounted on one of said members for operating the generator and having a rotatable winding shaft and a gear thereon; and a toothed rack carried by the other of said members and meshing with the gear to wind the spring.

3. In a wheeled vehicle having an electric storage battery and spring-connected members interrelatively movable vertically, mechanism of the character described, comprising: an electric generator for charging the battery; a coiled spring mounted on one of said members for operating the generator and having a rotatable winding shaft provided with a ratchet wheel; a gear turnably mounted on the shaft; a toothed rack carried by the other of said members and meshing with the gear; and a pawl carried by the gear and engaging the ratchet wheel.

4. In a wheeled vehicle having an electric storage battery and spring-connected members interrelatively movable vertically, mechanism of the character described, comprising: an electric generator for charging the battery; a coiled spring mounted on one of said members for operating the generator and having a rotatable winding shaft provided with ratchet wheels; gears turnably mounted on the shaft; toothed racks carried by the other of said members and meshing with the gears respectively on opposite sides of the shaft; and pawls carried by the gears respectively and engaging the respective ratchet wheels.

5. In a wheeled vehicle having an electric storage battery and spring-connected members interrelatively movable vertically, mechanism of the character described, comprising: an electric generator for charging the battery; a coiled spring mounted on one of said members for operating the generator and having a rotatable winding shaft and a gear thereon; a toothed rack carried by the other of said members and meshing with the gear to wind the spring; a ratchet wheel carried by the shaft; and a detent engaging the ratchet wheel to hold the spring in wound position.

6. In a wheeled vehicle having an electric storage battery and spring-connected members interrelatively movable vertically, mechanism of the character described, comprising: an electric generator for charging the battery; a coiled spring mounted on one of said members for operating the generator and having a rotatable winding shaft provided with a ratchet wheel; a gear turnably mounted on the shaft; a toothed rack carried by the other of said members and meshing with the gear; a pawl carried by the gear and engaging the ratchet wheel; a ratchet wheel carried by the shaft; and a detent engaging the ratchet wheel to hold the spring in wound position.

7. In a wheeled vehicle having an electric storage battery and spring-connected members interrelatively movable vertically, mechanism of the character described, comprising: an electric generator for charging the battery; a coiled spring mounted on one of said members for operating the generator and having a rotatable winding shaft provided with ratchet wheels; gears turnably mounted on the shaft; toothed racks carried by the other of said members and meshing with the gears respectively on opposite sides of the shaft; pawls carried by the gears respectively and engaging the respective ratchet wheels; a ratchet wheel carried by the shaft; and a detent engaging the ratchet wheel to hold the spring in wound position.

8. In a wheeled vehicle having an electric storage battery and spring-connected members interrelatively movable vertically, mechanism of the character described, comprising: an electric generator for charging the battery; spring-actuated means for operating the generator; connections extending between said members and operated by their interrelative movement for tensioning the spring of said spring-actuated means; and independent means for tensioning the spring of the spring-actuated means.

In testimony whereof we have hereunto set our hands at Grand Rapids, Michigan, this 30th day of July, 1923.

GEORGE ECKMAN.
ALBERT W. MOORE.